June 18, 1935.   B. L. SPITZER ET AL   2,005,114
DENTAL MODEL
Filed April 26, 1933
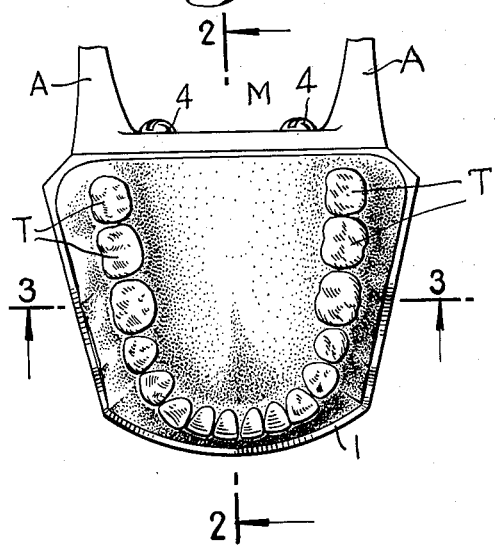
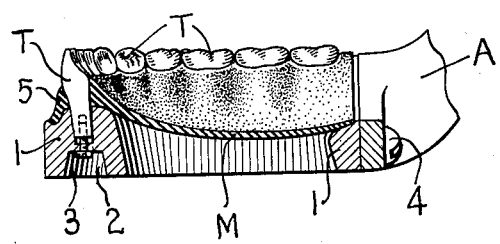
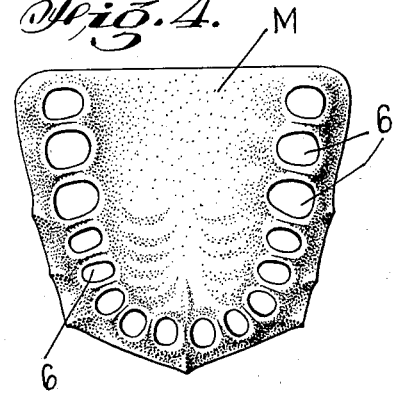
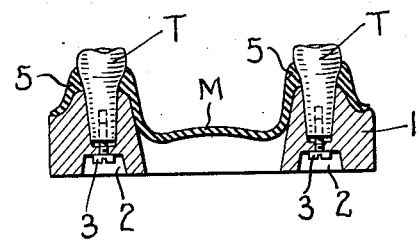
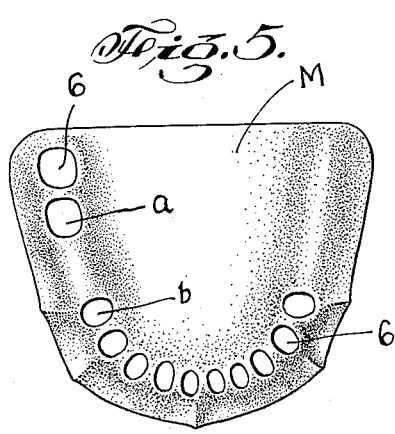
Benjamin L. Spitzer
Andrew Benko
INVENTORS
BY Mock & Blum
ATTORNEYS.

Patented June 18, 1935

2,005,114

UNITED STATES PATENT OFFICE 2,005,114

DENTAL MODEL

Benjamin L. Spitzer and Andrew Benko, New York, N. Y.

Application April 26, 1933, Serial No. 668,041

1 Claim. (Cl. 32—71)

My invention relates to a new and improved dental model.

One of the objects of our invention is to provide a dental model whose structure shall simulate the structure of the mouth of a patient.

Another object of our invention is to provide a dental model which can be made in a variety of shapes so that the model can be used for teaching all branches of reconstructive dentistry such as making inlays, individual crowns, bridges, partial dentures, full dentures or plates and the like.

Another object of our invention is to provide a model having a relatively soft and yieldable gum-simulating portion so that the student can be properly instructed and can have the work properly checked up.

Other objects of our invention will be set forth in the following description and drawing which illustrate a preferred embodiment thereof, it being understood that the above general statement of the objects of our invention is intended merely to generally explain the same and not to limit it in any manner.

Fig. 1 is a top plan view.

Fig. 2 is a sectional view on the line 2—2 of Fig. 1.

Fig. 3 is a sectional view on the line 3—3 of Fig. 1.

Fig. 4 is a top plan view of the base of the device.

Fig. 5 is a view similar to Fig. 4 showing a different embodiment.

In the drawing we have shown a portion of the model which corresponds to one jaw, and it is understood that two such portions can be connected by means of suitable hinges in order to represent the upper jaw and the lower jaw of a patient.

The device comprises a base 1 which can be made of metal or other suitable material. The base 1 is provided with a series of sockets which are upwardly and outwardly tapered. The teeth T are provided with lower ends or roots which fit into said sockets. The bottom of the base is provided with a groove 2. Each tooth T is held in position by any suitable means. Said means may comprise a screw 3 whose head is located within the groove or depression 2. The shank of the screw 3 passes through an unthreaded bore of the base 1, and said shank enters and engages an internally threaded recess which is provided at the bottom of the tooth T.

The base 1 may be connected to an arm A by means of screws 4 which pass through unthreaded bores of said arm A, and enter internally threaded recesses of the base 1.

A mask M is made of suitable soft rubber composition or like material. Said mask is made of vulcanized rubber which is readily bendable and which is also stretchable. Hence, the flexible mask M closely simulates the gums of a patient.

The mask M may have any suitable shape and it is provided with a convex edge portion 5 which fits over the top periphery of the base 1.

The mask is provided with openings 6. The number of openings in a mask may be varied according to the nature of the work which is to be taught. The mask M is first placed in position upon the top of the base 1 and the teeth 7 are then inserted and secured by means of the screws 3. Since the teeth T are upwardly and outwardly flared, they hold the mask M in position.

In Figs. 1 and 4, we have shown a mask having enough openings 6 to correspond to a full set of teeth. A model of this kind can be utilized for teaching the making of inlays, the making of individual crowns, etc.

The mask M which is shown in Fig. 5 has some of the openings 6 omitted at one or more parts thereof. For example, the mask shown in Fig. 5 can be utilized for teaching the making of a bridge between the openings which are designated by the reference letters $a$ and $b$.

If it is desired to teach the making of a full plate or denture, the openings may be omitted.

The manufacture of the mask from the rubber composition previously specified also makes it possible to simulate the shrinking of the gums which takes place when one or more teeth are extracted. This would correspond to the portion between the points $a$ and $b$ of Fig. 5.

The middle or interior portion of the mask M may have any shape, depending upon the shape of the type of base which is utilized.

The essential feature of the mask is that it has a portion which has a gum-simulating shape so that it simulates the gum-portion of the mouth of a patient. This gum-simulating portion of the mask is made of flexible rubber for the purposes specified, and the remainder of the mask may be even omitted, if desired. Likewise, while we prefer to use flexible rubber for making the gum-simulating portion of the mask, we do not wish to be limited to the use of rubber as other suitable flexible or distortable materials can be used.

The mask is preferably made of a red color so as to simulate the gum.

Another advantage of using a mask having a gum-simulating portion of relatively yieldable material is that if the drill or other instrument of the student slips, or said instrument is not operated properly, a mark is left upon the mask.

Likewise, in many cases of dental restoration, it is necessary to have the crown or the like extend underneath the gum of the patient. Practice work of this type can be readily performed with the improved mask due to the flexibility and resilience of the material which is utilized.

We claim:

A dental model comprising a base having a groove at its underside and having a gum-simulating portion, said portion of the base having a separable mask of similar contour, said mask extending over the top edge of the base and being made of yieldable and resilient rubber, said base having sockets therein, said mask having openings through which teeth individually pass to enter the openings of said base, and releaseable connecting means partly located in said groove and connecting said teeth to said base, said mask being separate from said base and being readily removable therefrom, and means connecting said portion of the base to the superposed portion of said mask.

BENJAMIN L. SPITZER.
ANDREW BENKO.